United States Patent [19]
Shimazaki

[11] Patent Number: 5,697,315
[45] Date of Patent: Dec. 16, 1997

[54] S-TYPE MARINE RUDDER

[76] Inventor: Susumu Shimazaki, 21-4 Matsuba-cho, Tokorozawa-Shi, Saitama-Ken, Japan

[21] Appl. No.: 539,624

[22] Filed: Oct. 5, 1995

[30] Foreign Application Priority Data

Oct. 7, 1994 [JP] Japan .................. P6-270595

[51] Int. Cl.$^6$ .................................................. B63H 25/06
[52] U.S. Cl. ............................................ 114/162; 114/166
[58] Field of Search ...................................... 114/162, 163, 114/166, 167; 440/66, 67; 244/87.88

[56] References Cited

U.S. PATENT DOCUMENTS 1,844,303  2/1932  Wagner ........................ 114/162
2,392,165  1/1946  Livingston .................... 114/162

FOREIGN PATENT DOCUMENTS 30896  2/1983  Japan ........................... 114/162

*Primary Examiner*—Jesus D. Sotelo
*Attorney, Agent, or Firm*—Adams & Wilks

[57] ABSTRACT

A marine rudder comprises a generally S-shaped rudder plate having a pair of semi-circular concave portions. The rudder plate is connected to the stern of a ship such that the semi-circular concave portions of the rudder plate are disposed on opposite sides of an axis of rotation of the propeller and in the path of a rotary flow produced by the propeller so that the semi-circular concave portions convert the rotary flow produced by the propeller to principally linear flow.

17 Claims, 3 Drawing Sheets

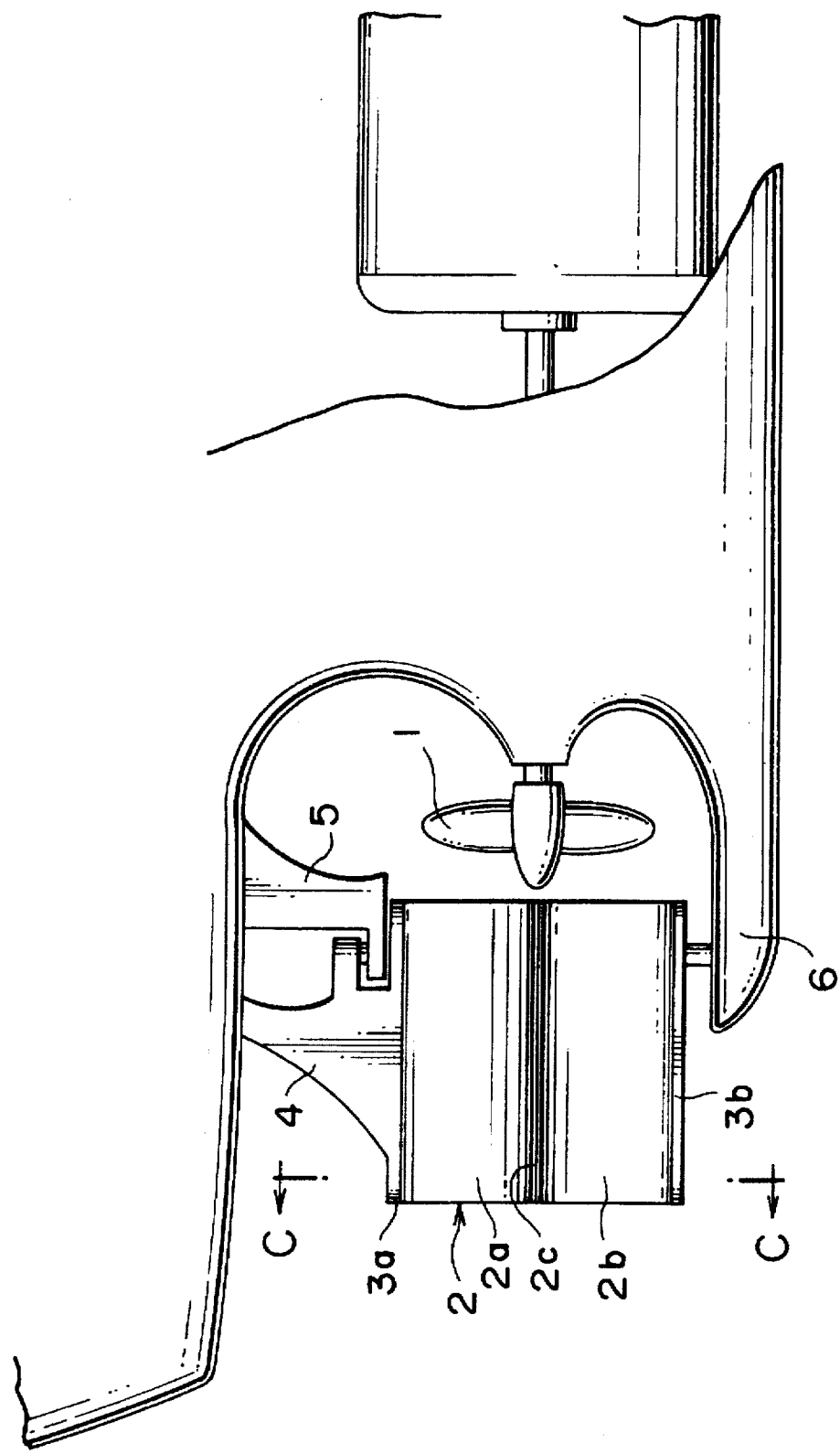

S-TYPE MARINE RUDDER

BACKGROUND OF THE INVENTION

1. Field of the Invention

The present invention relates to a rudder for use in ships, and more particularly, to a rudder plate having an S-type cross sectional contour for efficient utilization of a component of the rotary motion of water in the propeller slip stream as a thrust.

2. Description of the Related Art

In a conventional rudder mounted immediately behind a propeller, the leading edges of upper and lower half parts of the rudder having a blade-type section are mutually staggered to the right and left, so that a component of the rotary motion of water in a propeller slip stream can be changed into a thrust.

The conventional rudder stated above, however, has the following disadvantage that when the rudder receives the propeller slip stream when the ship is under way, a component of the rotary motion of the stream flowing along the rudder surface is changed only partly into thrust as a forward component of lift produced in the upper and lower half parts of the rudder, and most part of the rotary energy in the propeller slip stream can not be recovered as thrust.

For recovering a rotary energy in the propeller slip stream there has also been developed such a rudder as has been disclosed by Japanese Patent Laid-Open publication No. Hei 2-293296. This rudder is fitted with many long fins in a radial fashion on a fin boss protruding forward from the leading edge of a rudder horn. The provision of many long fins described above requires increasing the rudder strength, which, however, increases resistance also.

SUMMARY OF THE INVENTION

It is an object of the present invention to provide an S-type marine rudder the cross-sectional contour of which is approximately S-shaped to enable efficiently recovering and changing the rotary energy in the propeller slip stream into thrust whereby the above-described problems have been solved.

To accomplish the above object, in the S-type marine rudder of the present invention which is placed immediately behind a propeller at the after end of the ship, each cross sectional contour of a rudder plate, at both the upper and lower areas of the propeller axis of rotation, is mutually oppositely curved inwardly as nearly semi-circular, that is, in an S shape on the whole, to receive a rotary stream as the propeller slip stream.

Furthermore, in the S-type marine rudder of the present invention, the rudder plate is so formed that, with the rudder plate placed in a neutral position, each central longitudinal sectional contour of inwardly curved upper and lower half parts has an inclined front half section respectively each of which is mutually oppositely inclined inwardly with respect to the propeller axis of rotation to thereby smoothly lead the propeller slip stream to an inwardly curved section in the S-type cross-sectional contour, and an inclined back curved rear half section with the trailing edge of the rudder curved to direct to approximately the same direction as the propeller axis of rotation to thereby discharge the propeller slip stream by gradually changing the direction of flow of the propeller slip stream passed along the inclined front half section to a direction parallel to the axis of rotation.

Furthermore, in the S-type marine rudder of the present invention, each longitudinal sectional contour of the upper and lower half parts of the rudder plate gradually changes from an inclined curved shape of the central longitudinal section to a straight line approximately parallel to the propeller axis of rotation as it goes upward and downward, until the lower edge of the upper half part of the rudder plate and the upper edge of the lower half part are connected to each other by a straight-line connection; and at the same time either of an upper edge member and a lower edge member provided along the upper edge of the upper half part and the lower edge of the lower half part respectively of the rudder plate is formed straight in shape.

Furthermore, in the S-type marine rudder of the present invention, a rudder stock formed integrally with the upper edge member of the upper half part of the rudder plate is rotatably supported on a rudder post which is provided projecting downward from the stern of the hull, and the lower edge member of the lower half part of the rudder plate is rotatably supported by a shoe piece at the hull stern.

In the S-type marine rudder of the present invention described above, each cross-sectional contour of the rudder plate of the rudder mounted immediately behind the propeller, at upper and lower areas of the propeller axis of rotation, is formed in a semi-circular mutually oppositely curved inwardly shape, that is, S shape on the whole, so as to receive the propeller slip stream as the rotary stream; therefore, when the rudder is placed in a neutral position, all of the rudder plate functions like a duct for receiving the propeller slip stream, thereby enabling the correction of the water stream. During steering, the water stream is received from the front into the inwardly curved area of the upper and lower half parts of the rudder plate, thus obtaining a substantially satisfactory steering effect.

Furthermore since the rudder plate has, in each central longitudinal sectional contour of the upper and lower half parts thereof, an inclined front half section each of which is mutually oppositely curved inwardly to smoothly guide the propeller slip stream as the rotary stream into the inwardly curved section when the rudder plate is placed in a neutral position, and an inclined back curved rear half section for gradually changing the inflowing rotary stream to a straight-line stream, it is possible to properly correct the propeller slip stream as the rotary stream flowing toward the rudder plate.

Since each longitudinal sectional contour of the upper and lower half parts of the rudder plate gradually changes to a straight one which is nearly parallel to the propeller axis of rotation as it goes upward and downward from the inclined curved shape of the central longitudinal section, until the lower edge of the upper half part and the upper edge of the lower half part of the rudder plate are mutually linearly aligned and connected, the upper half part and the lower half part can smoothly and easily be connected.

Furthermore, since the upper and lower edge members used along the upper and lower edges of the upper and lower half parts of the rudder plate respectively are formed in a straight line, the rudder can easily be mounted to the hull.

Furthermore, since the rudder stock formed integrally with the upper edge member of the upper half part of the rudder plate is supported on the rudder post on the hull stern and the lower edge member of the lower half part of the rudder plate is supported by the shoe piece of the hull stern side, the rudder plate is very firmly supported.

Other objects, features and advantages of the present invention will appear hereinafter as the description proceeds with reference to the accompanying drawings.

BRIEF DESCRIPTION OF THE DRAWINGS

FIG. 2(a) is a sectional view taken along line A—A of FIG. 1, while

FIG. 3 is a side view of the ship's stern shown in FIG. 1; and

DETAILED DESCRIPTION OF THE PREFERRED EMBODIMENT

Figure 1:
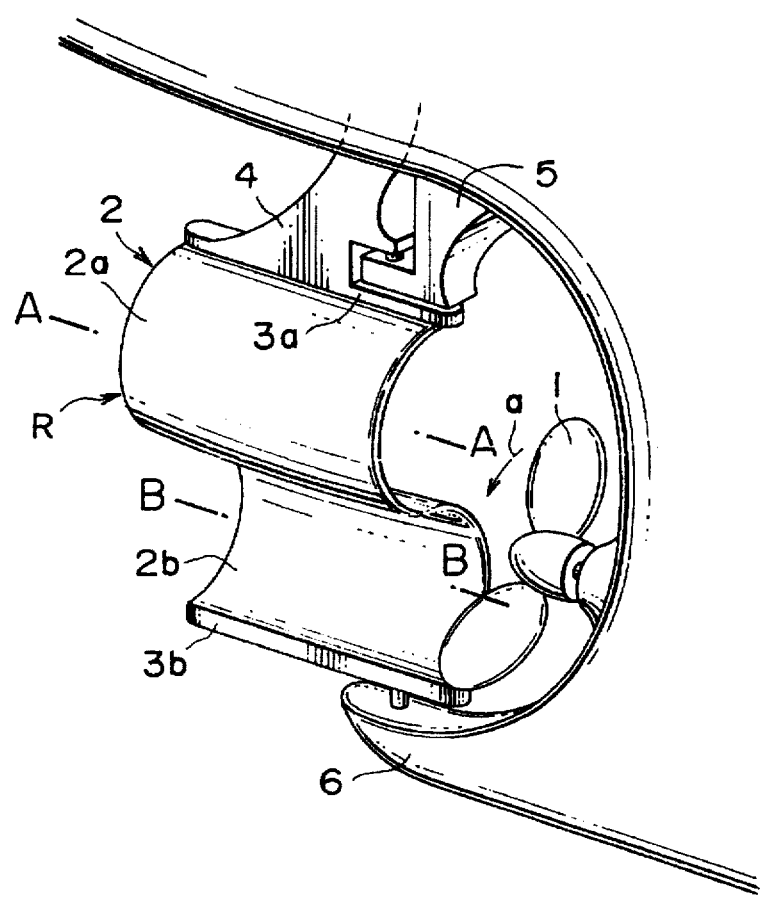
FIG. 1 is a perspective view of a stern of a ship mounted with one embodiment of an S-type marine rudder according to the present invention.
Figure 2A:
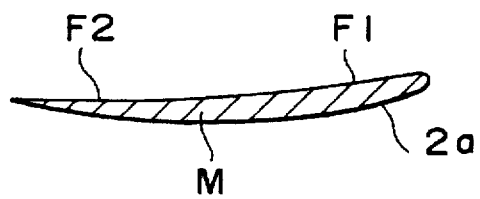
Figure 2B:
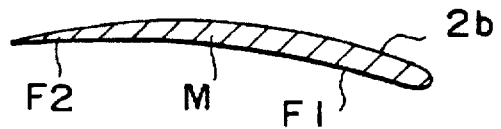
FIG. 2(b) is a sectional view taken along line B—B of FIG. 1.

Hereinafter one embodiment of an S-type marine rudder according to the present invention will be explained with reference to the accompanying drawings. FIG. 1 is a perspective view of a ship's stern where the rudder is mounted; FIG. 2(a) is a sectional view taken along line A—A of FIG. 1; FIG. 2(b) is a sectional view taken along line B—B of FIG. 1; FIG. 3 is a side view of the ship's stern shown in FIG. 1; and FIG. 4 is a sectional view taken along line C—C of FIG. 3.

Figure 4:
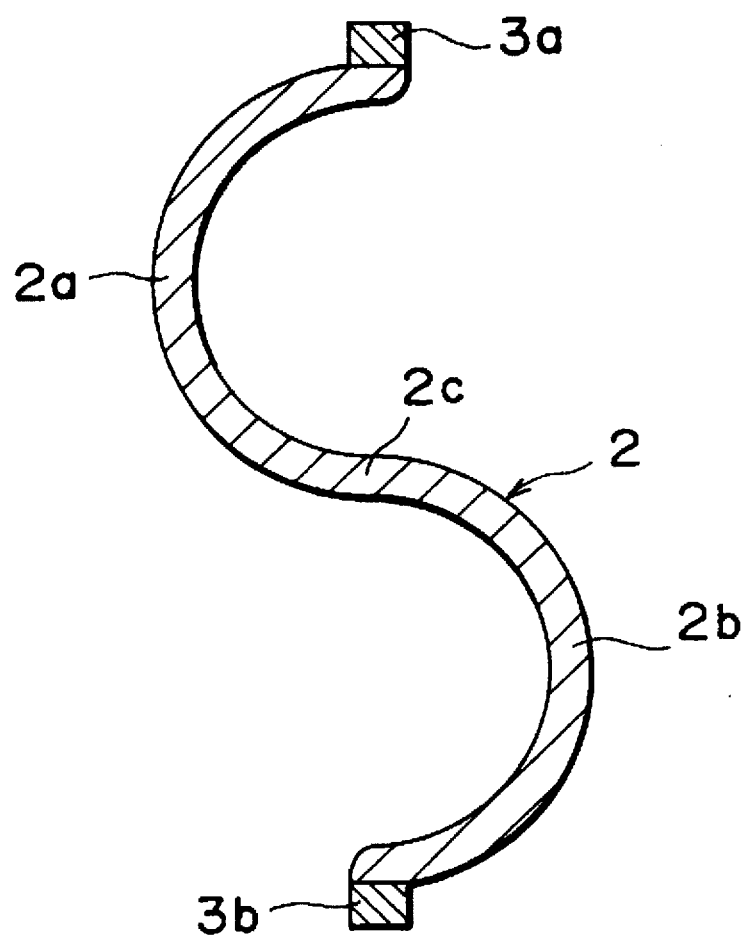
FIG. 4 is a sectional view taken along line C—C of FIG. 3.

As shown in FIGS. 1 and 3, a rudder plate 2 of a rudder R placed immediately behind a rotary flow generating device, such as a propeller 1, (propeller which turns clockwise "a" while the ship is going ahead) at the after end of a ship comprises an upper half part 2a and a lower half part 2b each having an approximately semi-circular cross section which are mutually oppositely curved inwardly so that the rotary stream may be received as a propeller slip stream to the inwardly curved surface at areas above and below the axis of rotation of the propeller 1, whereby the cross-sectional contour of the rudder plate 2 is formed in an S shape on the whole as viewed from the front as shown in FIG. 4.

In the case the propeller 1 turns counterclockwise when the ship is going ahead, the cross sectional contour of the rudder plate 2 is of an inverted S shape as viewed from the front; the S-type stated in the present invention includes this inverted S shape.

Each central longitudinal sectional contour of the upper half part 2a and the lower half part 2b of the rudder plate 2 is formed, as shown in FIGS. 1 and 2, in a blade type which is both thick at the central section M so that it may have, on the inner side, each inclined front half section F1 which is inclined mutually oppositely inward with respect to the propeller axis of rotation and each inclined back curved rear half section F2 which is curved to direct the trailing edge of the rudder to the same direction as the propeller axis of rotation by gradually changing the direction of the stream guided by the inclined front half section F1 to a direction parallel to the propeller axis of rotation so that, with the rudder placed in neutral (at zero rudder angle), the propeller slip stream as the rotary stream can smoothly be guided to the inwardly curved surface of the rudder.

Furthermore, each longitudinal sectional contour of the upper half part 2a and the lower half part 2b of the rudder plate 2 gradually changes to a straight line approximately parallel to the propeller axis of rotation as it goes upward and downward from the inclined curved shape of each central longitudinal section of these upper and lower half parts 2a and 2b until the lower edge of the upper half part 2a of the rudder plate and the upper edge of the lower half part 2b of the rudder plate are mutually connected longitudinally by the straight-line connection 2c as shown in FIGS. 3 and 4, and at the same time the upper edge part member 3a and the lower edge member 3b provided respectively along the upper edge of the upper half part 2a of the rudder plate and the lower edge of the lower half part 2b of the rudder plate are both formed straight.

A rudder stock 4 formed integrally with the upper edge member 3a is rotatably supported on a rudder post 5 projecting downward from the stern hull, while the lower edge member 3b is rotatably supported by a shoe piece 6 on the stern hull.

The S-type marine rudder of the present embodiment, being constituted as described above, has the following functional advantages. Since the rudder plate 2 of the rudder mounted immediately behind the propeller 1 is formed semi-circular in cross sectional contour, at both areas above and below the propeller axis of rotation, and each cross sectional contour is mutually oppositely curved inwardly, that is, in an S shape on the whole, so as to receive the propeller slip stream as the rotary stream, all the rudder plate, when placed in a neutral position, functions just like a duct for receiving the propeller slip stream while substantially performing stream correction, whereby part of the rotary energy in the propeller slip stream can be efficiently changed to the thrust. Also, during steering, the inflow of the stream into the inwardly curved section of the upper half part 2a or the lower half part 2b of the rudder plate 2 can obtain a substantial steering effect.

Since each central longitudinal sectional contour of the upper half part 2a and the lower half part 2b of the rudder plate 2 has an inclined front half section F1 each of which is mutually oppositely inclined inwardly to smoothly guide the propeller slip stream as the rotary stream and an inclined back curved rear half section F2 for gradually changing the inflow rotary stream to as straight-line stream, the propeller slip stream as the rotary stream inflowing to the rudder plate 2 can be properly corrected, thereby enabling further efficiently performing the change of the rotary energy in the propeller slip stream into the thrust.

Furthermore, since each longitudinal sectional contour of the upper half part 2a and the lower half part 2b of the rudder plate 2 gradually changes from the inclined curve of the central longitudinal section to a straight line approximately parallel to the propeller axis of rotation as it goes upward and downward, the lower edge of the upper half part and the upper edge of the lower half part of the rudder plate 2 are linearly connected each other, thus enabling smoothly and easily performing connection between the upper half part 2a and the lower half part 2b.

Furthermore, since the upper edge member 3a and the lower edge member 3b provided respectively along the upper edge of the upper half part 2a and the lower edge of the lower half part 2b of the rudder plate 2 are linearly formed, the rudder can easily be mounted to the hull.

Furthermore, the rudder stock 4 formed integrally with the upper edge member 3a of the upper half section 2a of the rudder plate 2 is supported on the rudder post 5 on the stern hull and the lower edge member 3b of the lower half part 2b of the rudder plate 2 is supported by the shoe piece 6 on the stern hull side, thereby supporting the rudder plate 2 very firmly.

Tests were conducted by using a model ship with the rudder plate 2 of the present invention fixed in a neutral position immediately behind the propeller 1. As a result, there was recognized an about 30-percent greater thrust as compared with a model ship equipped with a prior art flat rudder plate.

According to the S-type marine rudder of the present invention the following advantages are obtainable as heretofore described in detail.

(1) Each cross sectional contour of the rudder plate of the rudder mounted immediately behind the propeller, in both areas above and below the propeller axis of rotation, is mutually oppositely curved inwardly in a semi-circular form, that is, in the S shape on the whole, in order that the propeller slip stream as the rotary stream will be received; when the rudder is set in neutral, therefore, the entire body of the rudder plate functions just like a duct for receiving the propeller slip stream, while performing substantial correcting function and accordingly efficiently changing a part of the rotary energy in the propeller slip stream to the thrust.

(2) During steering, the water stream is taken into the inwardly curved section of the upper half part or the lower half part of the rudder plate, thereby gaining a substantial steering effect.

(3) Since each central longitudinal sectional contour of the upper half part and the lower half part of the rudder plate has the inclined front half section each of which is mutually oppositely inclined inwardly with respect to the propeller axis of rotation to smoothly guide the propeller slip stream as the rotary stream into the inwardly curved section, and the inclined back curved rear half section which gradually changes the inflow rotary stream to a straight-line stream, the propeller slip stream as the rotary stream flowing to the rudder plate can be further properly corrected, thereby insuring more efficient change of the rotary energy in the propeller slip stream to the thrust.

(4) Since the longitudinal sectional contour of the upper half part and the lower half part of the rudder plate gradually changes from the inclined curve of the central longitudinal section to a straight line nearly parallel to the propeller axis of rotation as it goes upward and downward until the lower edge of the upper half part and the upper edge of the lower half part of the rudder plate are connected each other in a straight line, the connection between the upper half part and the lower half part can be done smoothly and easily.

(5) Since the upper edge member and the lower edge member of the upper edge of the upper half part and the lower edge of the lower half part of the rudder plate are formed straight respectively, the rudder can easily be mounted to the hull.

(6) Since the rudder stock formed integrally with the upper edge member of the upper half part of the rudder plate is supported on the rudder post on the stern hull and also the lower edge member of the lower half part of the rudder plate is supported by the shoe piece on the stern hull side, the rudder plate can be supported very firmly.

(7) Substantial improvement in thrust performance can be expected simply by replacing a prior art rudder of an existing ship with the S-type rudder of the present invention.

What is claimed is:

1. A marine rudder for connection immediately aft of a propeller at the stern of a ship, the rudder comprising:
a generally S-shaped rudder plate having a pair of generally semi-circular concave portions; and means for connecting the rudder plate to the stern of a ship immediately aft of a propeller such that the semi-circular concave portions of the rudder plate are disposed on opposite sides of an axis of rotation of the propeller and in the path of a rotary flow produced by the propeller so that the semi-circular concave portions convert the rotary flow produced by the propeller to principally linear flow.

2. A marine rudder according to claim 1; wherein a central longitudinal sectional contour of each semi-circular concave portion of the rudder plate has an inclined front half section for smoothly guiding the rotary flow produced by the propeller through each semi-circular concave portion when the rudder plate is placed in a neutral position, and an inclined curved rear half section for directing a trailing edge of the rudder toward a direction substantially parallel to the axis of rotation of the propeller to thereby discharge the rotary flow produced by the propeller and received by the semi-circular concave portions by gradually changing the direction of the flow passed along the inclined front half section to a direction parallel to the axis of rotation of the propeller.

3. A marine rudder according to claim 2; wherein the central longitudinal sectional contour of each semi-circular concave portion of the rudder plate gradually changes to a straight line which is nearly parallel to the axis of rotation of the propeller and which connects the lower edge of one of the semi-circular concave portions to the upper edge of the other of the semi-circular concave portions of the rudder plate; and further comprising an upper edge member integrally connected to the upper edge of the one semi-circular concave portion of the rudder plate, and a lower edge member integrally connected to the lower edge of the other semi-circular concave portion of the rudder plate, each of the upper and lower edge members having a surface which is substantially parallel to the axis of rotation of the propeller.

4. A marine rudder according to claim 3; wherein the connecting means comprises a rudder stock integrally connected to the upper edge member of the one semi-circular concave portion of the rudder plate for rotatable connection to a rudder post projecting downward from the stern of the ship, and a pin integrally connected to the lower edge member of the other semi-circular concave portion of the rudder plate for rotatable connection to a shoe portion of the stern of the ship.

5. A rudder for connection immediately aft of a rotary flow generating device at an end of a vessel, the rudder comprising: a plate having a pair of generally semi-circular concave portions; and means for connecting the plate to the end of the vessel immediately aft of the flow generating device with the semi-circular concave portions of the plate disposed in the path of a rotary flow produced by the rotary flow generating device so that the semi-circular concave portions convert the rotary flow produced by the rotary flow generating device to principally linear flow.

6. A rudder according to claim 5; wherein the flow generating device comprises a propeller, and the connecting means connects the plate to the end of the vessel immediately aft of the propeller such that the semi-circular concave portions of the plate are disposed on opposite sides of an axis of rotation of the propeller.

7. A rudder according to claim 6; wherein a central longitudinal sectional contour of each semi-circular concave portion of the plate has an inclined front half section for smoothly guiding the rotary flow produced by the propeller through each semi-circular concave portion when the plate is placed in a neutral position, and an inclined curved rear half section for directing a trailing edge of the plate toward a direction substantially parallel to the axis of rotation of the propeller to thereby discharge the rotary flow received by the semi-circular concave portions by gradually changing the direction of the flow passing along the inclined front half section to a direction parallel to the axis of rotation of the propeller.

8. A rudder according to claim 7; wherein the central longitudinal sectional contour of each semi-circular concave portion of the plate gradually changes to a straight line which is nearly parallel to the axis of rotation of the propeller and which connects the lower edge of one of the semi-circular concave portions to the upper edge of the other of the semi-circular concave portions of the plate; and further comprising an upper edge member integrally connected to the upper edge of the one semi-circular concave portion of the plate, and a lower edge member integrally connected to the lower edge of the other semi-circular concave portion of the plate, each of the upper and lower edge members having a surface which is substantially parallel to the axis of rotation of the propeller.

9. A rudder according to claim 8; wherein the connecting means comprises a connecting member integrally connected to the upper edge member of the one semi-circular concave portion of the plate for rotatable connection to a post projecting from the end of the vessel, and a pin integrally connected to the lower edge member of the other semi-circular concave portion of the plate for rotatable connection to a portion of the end of the vessel.

10. A rudder according to claim 5; wherein the connecting means includes means for pivotally connecting the plate to the end of the vessel.

11. A rudder according to claim 10; wherein the means for pivotally connecting the plate to the end of the vessel comprises a connecting member integrally connected to an edge of one of the semi-circular concave portions and pivotally connected to a post projecting from the end of the vessel, and a pin integrally connected to an edge of the other of the semi-circular concave portions and pivotally connected to the end of the vessel.

12. A rudder according to claim 5; wherein the plate is generally S-shaped.

13. A rudder comprising: a plate having a pair of generally semi-circular concave portions for pivotal connection aft of a propeller at the stern of a ship such that the semi-circular concave portions are disposed in the path of a rotary flow produced by the propeller, the semi-circular concave portions having a shape effective to convert the rotary flow produced by the propeller to principally linear flow.

14. A rudder according to claim 13; wherein the plate is generally S-shaped.

15. A rudder according to claim 13; wherein a central longitudinal sectional contour of each semi-circular concave portion of the plate has an inclined front half section for smoothly guiding the rotary flow produced by the propeller through each semi-circular concave portion when the plate is placed in a neutral position, and an inclined curved rear half section for directing a trailing edge of the plate toward a direction substantially parallel to an axis of rotation of the propeller to thereby discharge the rotary flow received by the semi-circular concave portions by gradually changing the direction of the flow passing along the inclined front half section to a direction parallel to the axis of rotation of the propeller.

16. A rudder according to claim 15; wherein the central longitudinal sectional contour of each semi-circular concave portion of the plate gradually changes to a straight line which is nearly parallel to the axis of rotation of the propeller and which connects the lower edge of one of the semi-circular concave portions to the upper edge of the other of the semi-circular concave portions of the plate; and further comprising an upper edge member integrally connected to the upper edge of the one semi-circular concave portion of the plate, and a lower edge member integrally connected to the lower edge of the other semi-circular concave portion of the plate, each of the upper and lower edge members having a surface which is substantially parallel to the axis of rotation of the propeller.

17. A rudder according to claim 16; wherein the connecting means comprises a connecting member integrally connected to the upper edge member of the one semi-circular concave portion of the plate for rotatable connection to a post projecting from the end of the vessel, and a pin integrally connected to the lower edge member of the other semi-circular concave portion of the plate for rotatable connection to a portion of the end of the vessel.

* * * * *